US008902450B2

(12) United States Patent
Scrafford et al.

(10) Patent No.: US 8,902,450 B2
(45) Date of Patent: Dec. 2, 2014

(54) METHODS AND SYSTEMS FOR SOFT FAILURE DETECTION FOR NETWORKED PRINTERS

(75) Inventors: Matthew Scrafford, Fairport, NY (US); Shawn Kammerdiener, Rochester, NY (US); Victor Ciriza, La Tour du Pin (FR); Pascal Valobra, Meylan (FR); Bruno Marquie, St. Martin d'Heres (FR); Kirk Pothos, Webster, NY (US); Guillaume Bouchard, Crolles (FR)

(73) Assignee: Xerox Corporation, Norwalk, CT (US)

( * ) Notice: Subject to any disclaimer, the term of this patent is extended or adjusted under 35 U.S.C. 154(b) by 1162 days.

(21) Appl. No.: 11/696,459

(22) Filed: Apr. 4, 2007

(65) Prior Publication Data

US 2008/0246987 A1    Oct. 9, 2008

(51) Int. Cl.
*G06F 3/12* (2006.01)
*G06F 11/07* (2006.01)
*G03G 15/00* (2006.01)

(52) U.S. Cl.
CPC ........ *G06F 11/0733* (2013.01); *G06F 11/0751* (2013.01); *G06F 3/1294* (2013.01); *G06G 11/008* (2013.01); *G03G 15/5075* (2013.01)
USPC .......................... 358/1.15; 358/1.13; 358/1.14

(58) Field of Classification Search
USPC .................................. 358/1.1, 1.6, 1.14, 1.15
See application file for complete search history.

(56) References Cited

U.S. PATENT DOCUMENTS

| | | | |
|---|---|---|---|
| 5,488,715 A | 1/1996 | Wainwright | |
| 6,456,387 B1 * | 9/2002 | Pardo et al. | 358/1.13 |
| 6,498,656 B1 | 12/2002 | Mastie et al. | |
| 6,732,195 B1 | 5/2004 | Baldwin | |
| 6,782,345 B1 | 8/2004 | Siegel et al. | |
| 6,901,446 B2 * | 5/2005 | Chellis et al. | 709/226 |
| 7,086,001 B1 * | 8/2006 | Hicks et al. | 715/209 |
| 7,086,011 B2 | 8/2006 | Budrys et al. | |
| 7,567,946 B2 | 7/2009 | Andreoli et al. | |
| 7,949,740 B2 * | 5/2011 | Scrafford et al. | 709/223 |
| 2002/0196463 A1 | 12/2002 | Schlonski et al. | |
| 2003/0090697 A1 | 5/2003 | Lester et al. | |
| 2003/0093521 A1 | 5/2003 | Schlonski et al. | |

(Continued)

FOREIGN PATENT DOCUMENTS

| | | |
|---|---|---|
| EP | 0 921 465 | 6/1999 |
| JP | 04344967 A | 12/1992 |

(Continued)

OTHER PUBLICATIONS

CUPS Software Administrators Manual, Chapter 4, "Printer Classes", available on the Internet at www.cups.org/PRINTER_CLASSES, CUPS-SAM-1.1.21, Easy Software Products, 2003.

(Continued)

*Primary Examiner* — King Poon
*Assistant Examiner* — Lawrence Wills
(74) *Attorney, Agent, or Firm* — Fay Sharpe LLP

(57) ABSTRACT

Methods and systems are presented for identifying potential printer failures in a networked printing enterprise, in which job tracking data is gathered for print jobs in the network, affinity data is derived from the job tracking data indicating associations between printer devices and user devices, and potential printer failures are identified based on changes in the affinity data.

21 Claims, 5 Drawing Sheets

(56) References Cited

U.S. PATENT DOCUMENTS

| | | |
|---|---|---|
| 2003/0110413 A1 | 6/2003 | Bernklau-Halvor |
| 2003/0142344 A1 | 7/2003 | Geske et al. |
| 2003/0156683 A1 | 8/2003 | Adachi |
| 2004/0103337 A1 | 5/2004 | Smith |
| 2006/0044600 A1 | 3/2006 | Oosawa |
| 2006/0132826 A1 | 6/2006 | Ciriza et al. |
| 2006/0149598 A1 | 7/2006 | Adachi |
| 2006/0197973 A1 | 9/2006 | Castellani et al. |
| 2006/0206445 A1 | 9/2006 | Andreoli et al. |
| 2006/0259549 A1 | 11/2006 | Huang |
| 2007/0268509 A1* | 11/2007 | Andreoli et al. ............. 358/1.14 |
| 2008/0246986 A1* | 10/2008 | Scrafford et al. ............ 358/1.15 |
| 2008/0246987 A1 | 10/2008 | Scrafford et al. |

FOREIGN PATENT DOCUMENTS

| | | |
|---|---|---|
| JP | 10296593 | 11/1998 |
| JP | 2003177945 | 6/2003 |
| JP | 2004234082 | 8/2004 |

OTHER PUBLICATIONS

Microsoft Knowledge Base Article, No. 318749, "How to: Create a Printing Pool in Windows 2000", available on the Internet at www.Support.microsoft.com, Sep. 2003.

Product Brochure, "HP Output Server, Reliable Document Delivery Across the Enterprise", available on the Internet at http://www.hp.com/united-states/outputmanagement/products/hpom_output_srvr.pdf, Apr. 2004.

Product Brochure, "JETCAPS® ClusterQue, Balanced and Controlled Volume Printing", available on the Internet at http://h40041.www4.hp.com/contents/solutions.pdf/ds_clusterque.pdf, Jul. 2004.

European Search Report, EP 08 15 2983, Jan. 27, 2010.

CUPS Software Administrators Manual, Chapter 4, "Priner Classes", available on the Internet at www.cups.org/PRINTER CLASSES, CUPS-SAM-1.1.21, Easy Software Products, 2003.

Microsoft Knowledge Base Article, No. 318749, How to create a Printing Pool in Windows 2000, available on the internet at www.support.microsoft.com, Sep. 2003.

Product brochure, "HP Output Server, Reliable Document Delivery Across the Enterprise", available on the internet at hhttp://www.hp.com/united-states/outputmanagement/products/hpom_output_srvr.pdf, Apr. 2004.

Product brochure, "JetCAPSClusterQue, Balanced and Controlled Volume Printing", available on the internet at hhtp:/h40041.www4.hp.com/contents/solutions/pdf/ds_clusterque.pdf, Jul. 2004.

EP Search Report, EP 08 15 2982, Nov. 18, 2009.

Teresa F. Lunt, R. Jagannathan, Rosanna Lee, Alan Whitehurst, Knowledge-based Intrusion Detection, pp. 102-107, 1989.

* cited by examiner

METHODS AND SYSTEMS FOR SOFT FAILURE DETECTION FOR NETWORKED PRINTERS

BACKGROUND

The present disclosure is generally related to detecting failures in printer output devices such as printers, copiers, facsimile machines and the like in networked printing environments where users submit print jobs to one of a number of printer devices connected to a network. Enterprises such as businesses, universities, government agencies, etc. often network large numbers of personal computers and printers together, allowing users to print to different printer devices based on print job characteristics, printer device capabilities, proximity of a given user to certain printers, and other factors. Distributed computing and printing enterprise architectures provide economic advantages by allowing direction of individual print jobs to the suitable printer with the lowest cost while also maximizing printer device utilization. In addition, networked printer systems can provide redundancy for situations in which one or more printer devices are off-line for servicing or where a given printer is occupied by a very large print job.

In operating such networked systems, printers must be serviced from time to time, in order to provide optimal print support for the users connected to the network. Printer failures can include a variety of situations in which a printer device is unable to print jobs sent to it through the network, and the fault conditions can be indicated to service personnel in a number of different ways. For example, a user may notice that a particular networked printer is malfunctioning and report the printer failure to administrative or service personnel by placing a telephone call, by sending an email, or by personally notifying the appropriate person in the enterprise, who then arranges for printer service or maintenance to remedy the failure. In another example, the printer device may include on-board diagnostic capabilities by which a printer failure is automatically detected and reported through the network. However, certain printer faults or failures may not be reported by users, who may instead simply redirect their print jobs to another printer on the network. Moreover, some printers may not include diagnostic components and/or the on-board systems may not be able to accurately detect all possible types of printer failures. These situations may include any type of printer fault, such as poor or degraded print/copy quality, incorrect configuration, reduced printer speed, failure of self-diagnostic system in the printer, etc. As a result, conventional networked printer systems cannot ensure that all printer failures are reported to appropriate service personnel in a timely fashion, and printer problems may remain unreported for extended periods of time before service personnel are notified. The latency in servicing failed printer devices increases the cost of the networked enterprise as a whole, and thus there remains a need for improved techniques for identifying printer problems in networked printing systems.

BRIEF DESCRIPTION

The present disclosure provides methods and systems for identifying printer problems by detecting changes in user behavior, and may be advantageously employed to improve printer availability and/or to reduce printer down-time and increase printer device utilization in networked printing environments. Techniques are disclosed in which affinity information or data is determined from job tracking data and employed to track printer usage over time to ascertain affinities between printers and users that reflect common use of two or more given printers by a user or set of users. Changes in the printer affinity data are detected to indicate a soft failure such as poor image quality or other fault or failure that would cause users to avoid a particular machine. In this manner, changes in printer affinities can be correlated to possible underlying printer problems leading to user preference change, facilitating identification of potential printer failures without reliance upon users manually reporting problems or on-board printer diagnostic systems.

Methods are provided for identifying potential printer failures in a networked printing system according to one or more aspects of the disclosure. The methods include gathering job tracking data for print jobs in a network, and identifying potential printer failures based at least partially on the job tracking data. One embodiment provides for identifying potential printer failures by determining affinity data indicating associations between printer devices and user devices based on the job tracking data, determining changes in the affinity data, and identifying potential printer failures based at least in part on the changes in the affinity data. Some examples include identifying a given printer device as having a potential failure if the affinity data indicates a change in user preference away from the printer and/or if a change in the affinity data associated with the printer device exceeds a threshold value. Further examples include identifying a potential failure in a given printer if the job tracking data indicates that at least one user has substantially stopped printing to the first printer device in favor of another printer.

In other aspects of the disclosure, a method is provided for detecting a change in pattern of use of networked printers. The method comprises gathering job tracking data for print jobs in a network and determining affinity data indicating associations between printer devices and user devices based on the job tracking data. The method further provides for determining changes in the affinity data and detecting a change in pattern of use of a first printer based on a change in the affinity data associated with the first printer device. The method in certain implementations may further include identifying a potential failure in the first printer if the detected change in the pattern of use of the printer exceeds a threshold value, and/or if a detected change in the usage pattern indicates a change in user preference away from the first printer, and/or that at least one user has substantially stopped printing to the first printer device in favor of another printer device.

Further aspects of the disclosure are related to a system for identifying potential printer failures. The system includes an affinity component operative to gather job tracking data for print jobs in the network, and a failure detection component operative to identifying potential printer failures based at least partially on the job tracking data. In one implementation, the affinity component and the failure detection component are implemented in software running on a network server that receives the job tracking data for print jobs in the network. The affinity component in certain embodiments determines affinity data that reflects associations between printer devices and user devices based on the job tracking data. In this embodiment, the failure detection component determines changes in the affinity data, and identifies potential printer failures based at least partially on the changes in the affinity data, such as by identifying a potential failure in a given printer if changes in the corresponding affinity data indicate a change in user preference away from the printer, or that one or more users have substantially stopped printing to the first printer device in favor of another printer device, and/or if the affinity change exceeds a threshold.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
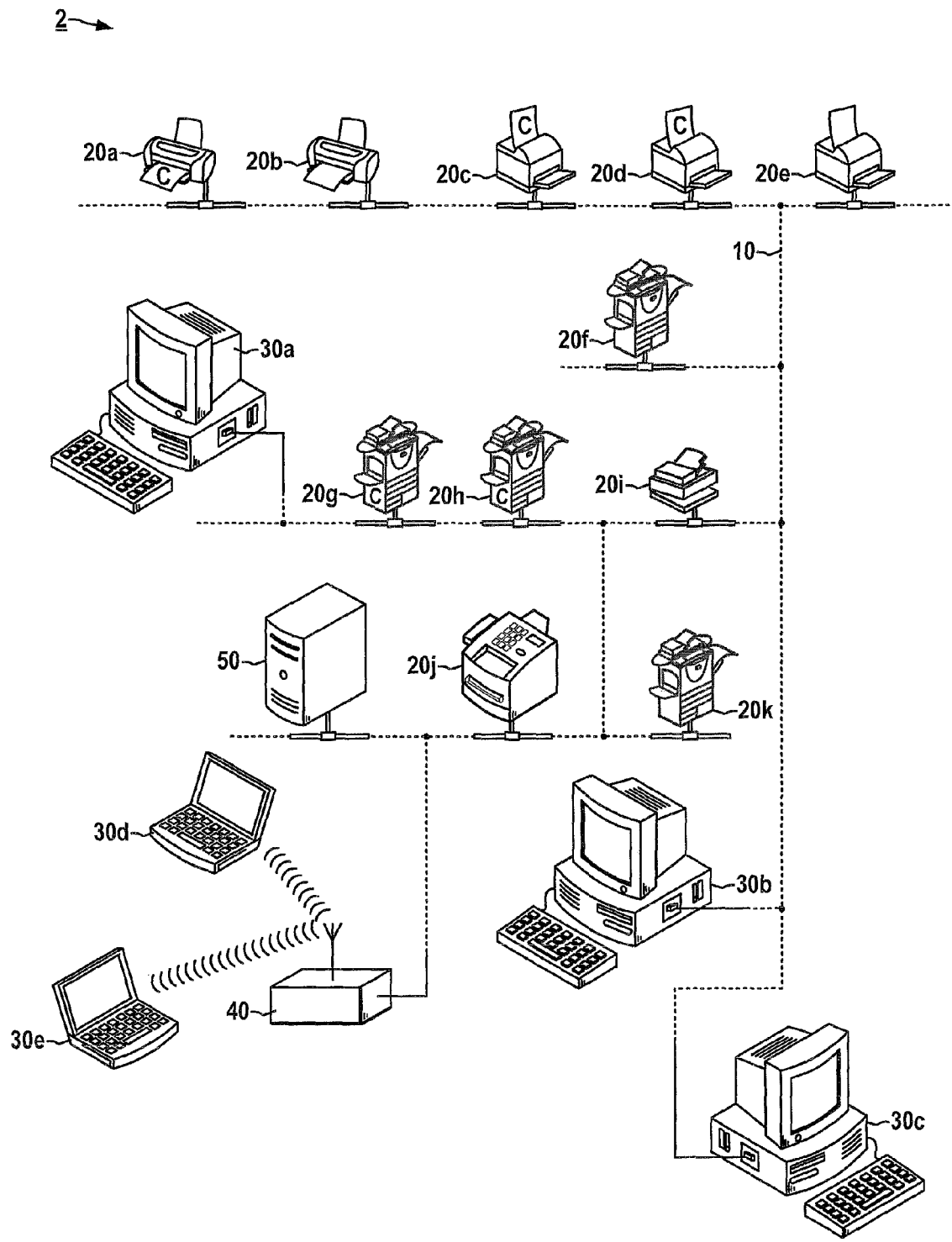
FIG. 1 is a system diagram illustrating an exemplary distributed computing environment with a plurality of user computers and printer output devices operatively coupled to a network along with a network print server in which various aspects of the present disclosure may be implemented.

Referring now to the drawings, FIG. 1 illustrates a distributed computing environment or system 2 in which one or more aspects of the present disclosure may be carried out. The exemplary system 2 includes a network 10 with which a plurality of printer output devices 20 and user computers 30 are operatively coupled. In addition, one or more print servers 50 are coupled with the network 10, where certain portions of the network 10 may be interconnected by cabling or one or more portions may be wireless, and where one or more exemplary computers 30d and 30e are illustrated in FIG. 1 with operative communicative coupling to the network 10 being implemented using a wireless network transceiver interface component 40. Any number of user devices 30 may be operatively coupled to the network 10 including without limitation desktop computers 30a-30b, laptop computers 30d, 30e, and any number and type of printer output devices 20 may be coupled with the network 10.

Various different printer devices 20 are networked together in the system 2 in order to provide the user devices 30 with a broad range of printing options available for servicing a given print job. In the example of FIG. 1, the available printer output devices 20 include relatively low throughput externally fed color as well as black and white desktop printers 20a and 20b, respectively, intermediate speed drawer fed color and black and white printers 20c-20e, high volume color as well as black and white printer/scanner/copier devices 20f-20h and 20k, a desktop combination printer/scanner/copier 20i and a combination printer and facsimile machine 20j. The network 10, moreover, can be arranged in any suitable configuration, for example, such as star, ring, bus, tree, mesh, etc. or combinations thereof, and may be a wired network, a wireless network, or combinations thereof, wherein the illustrated system 2 includes one or more wireless nodes 40 providing connectivity for portable laptop computers 30d and 30e through various WiFi or other wireless means. The system 2 thus constitutes an embodiment of a networked printing system with a plurality of user devices 30 operably coupled with the network 10 and a plurality of printer devices 20 with the server 50 also operably coupled with the network 10.

Figure 2:
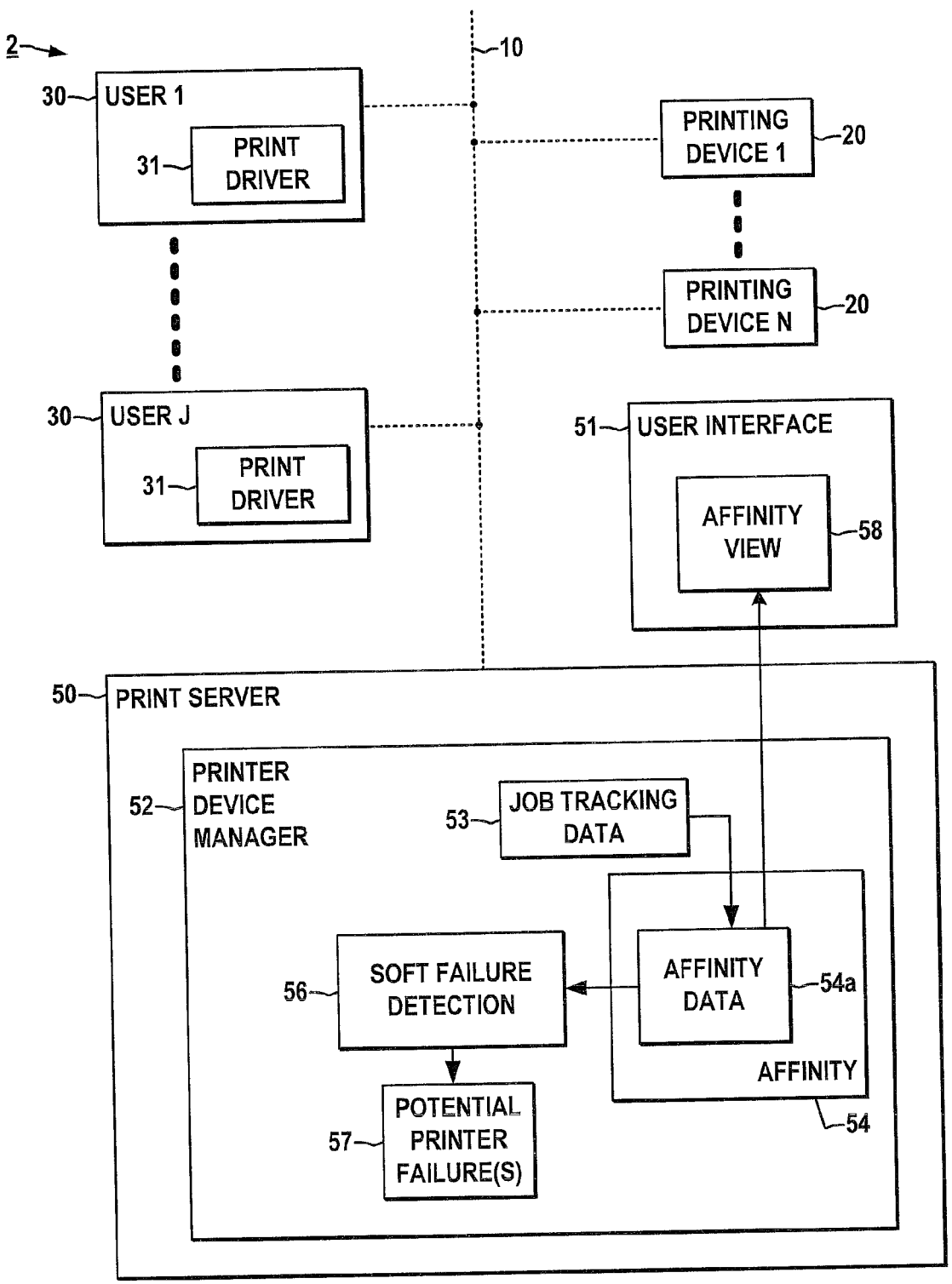
FIG. 2 is a schematic diagram illustrating further details of the print server in the networked system of FIG. 1, including a printer device manager program with an affinity data component that determines affinity data values according to job tracking data and a soft failure detection component that determines potential printer device failures based on the affinity data.

Referring also to FIG. 2, the networked system 2 further includes a printer device manager component 52 operatively coupled with the network 10. In one embodiment, the manager component 52 can be one or more software application programs running on the network server 50. Other embodiments are possible, for example, wherein the printer device manager 52 is implemented in any suitable hardware, software, logic, firmware, or combinations thereof, whether unitary or implemented in distributed fashion in a number of networked host devices, by which the device manager 52 is operatively communicatively coupled with other devices (e.g., printers 20, user devices 30, etc.) via the network 10. In this regard, the printer device manager 52 may be an application running on any computing host capable of communicating with the printers 20 and users 30 of the system, whether directly coupled to the network 10 or coupled therewith through one or more intervening networks or different network topologies. As further shown in FIG. 2, the user devices 30 may include one or more print drivers 31, such as driver software running on the user devices 30, which may interact with the printer device manager component 52 in supporting various printing services and printer device management actions or functions in the networked enterprise system 2.

In accordance with one or more aspects of the present disclosure, the printer device manager 52 receives job tracking data 53 associated with print jobs submitted by user devices 30 to printer output devices 20 in the network 10. In addition, the device manager 52 identifies printer devices 20 in the network 10 that require maintenance or servicing via network messages from on-board self-diagnostic components in the printers 20. In one embodiment, the device manager 52 receives messages from the printer devices 20 via the network 10 indicating printer status, for example, "ready", "busy", "off-line", "out-of-service", "out-of-paper", "toner low", etc., where such messages may be prompted by polling messages from the device manager 52 or may be initiated by the printer devices 20 themselves or combinations thereof. The device manager 52 also identifies potential printer failures 57 based at least partially on the job tracking data 53 as illustrated and described further below. Moreover, the printer device manager component 52 may implement a calendar-based maintenance scheduling function in which the device manager tracks the maintenance needs of one or more of the printers 20 and determines whether maintenance is required or recommended for the various printers 20 on the network 10 based on the maintenance function and the current time and date. Furthermore, the printer device manager 52 is adapted to receive input data via a user interface 51 coupled to the print server 50, by which service or maintenance calls or emails from users 30 can be logged with related information about specific printer problems, status conditions, toner or paper supply requirements, etc. The device manager 52 may also communicate with other computers, servers, etc., whether directly or indirectly coupled with the network 10, by which other information may be obtained that indicates or tends to indicate that one or more printer devices 20 on the network 10 require servicing and/or maintenance. For instance, user devices 30 may provide printer status information to the device manager 52 via emails or other forms of messaging via the network 10 from which the device manager 52 determines whether a given printer device 20 is in need of service or maintenance.

The printer device manager 52 also includes an affinity component 54 which gathers the job tracking data 53 and determines affinity data 54a indicating associations between printer devices 20 and user devices 30 based on the job tracking data 53. The exemplary device manager 52 also includes a failure detection component 56 that can be any suitable hardware, software, firmware, etc., or combinations thereof, which uses the affinity data 54a in whole or in part to identify potential failures 57 in the networked printers 20. In this manner, potential printer failures 57 are identified at least partially based on the job tracking data 53, and the automatic identification of potential printer faults 57 (whether or not these are reported by other means in the system 2) can be used to augment printer problems reported by users 30 and/or those indicated by self-diagnostic systems in the printers 20 themselves, so as to facilitate provision of printer service and maintenance to the devices 20 of the system 2 in a timely fashion. In the embodiment of FIGS. 1 and 2, moreover, the print server 50 and the device manager component 52 thereof are operatively coupled with a user interface 51 for receiving operator inputs and for displaying or rendering information to an operator. In this regard, the affinity component 54 of the exemplary device manager 52 in FIG. 2 provides an affinity view or rendering 58 to the user interface 51, as illustrated and described further below with respect to FIG. 3.

In one embodiment, the affinity data 54a is determined by the affinity component 54 at least partially according to the job tracking information 53 to indicate associations between the printer devices 20 and user devices 30 based on the job tracking data 53. The job tracking data 53 indicates or includes various parameters associated with a submitted print job, including the identity of the submitting user device 30, the time and date of job submission, a target printer device 20 to which the job was initially submitted, and the identity of any secondary or alternate printer device 20 to which the job may have been redirected. In addition, the job tracking data 53 may include information regarding the specific printing requirements of the job, including without limitation document type, requested media size, document color, page count, duplexing conditions, and finishing options such as stapling, binding, collating, etc. From the job tracking data 53 concerning user print requests to print output devices 20, the affinity component 54 of the printer device manager 52 determines the affinity data 54a using any suitable mathematical analysis, data sorting, or other algorithms or computational techniques to correlate patterns of user printing behavior to derive affinities that exist between devices 20 themselves and between users 30 and printer devices 20, as well as affinities between the user devices 30 themselves. The affinity data 54a is then utilized by the failure detection component 56 in the identification of potential printer failures 57.

The affinity data 54a may be any form of numeric and/or graphical representation, such as affinity values, that are derived from the job tracking data 53. The affinity data or value 54a associated with or between printer output devices 20 is a measure of their common use by a user or set of users. For instance, if a first user device 30 sends print jobs to only two printers 20, there is an affinity between those two printer devices 20. If a second user 30 also prints to those two printers 20, the affinity between these printers 20 is increased. Similarly, the common usage of one or more printers 20 by two given users 30 indicates an affinity between the users 30 based on their corresponding print job tracking data 53. In this regard, the present disclosure contemplates that because the job tracking data 53 is dynamic and is updated by further print job submissions, the job submission, job redirection, and the derived affinity data 54a will tend to adapt to changes in the print environment in the system 2, including changes in the printing behavior of the users 30. Accordingly, one or more relationships, events, and/or conditions may be inferred or detected based on the affinity data 54a or changes therein (affinity change values derived from the affinity data 54a), such as the likelihood that a printer 20 is in need of servicing, maintenance, reconfiguration, or other attention to ameliorate user dissatisfaction that may have caused a change in the printer usage pattern (e.g., potential printer failure).

Figure 3:
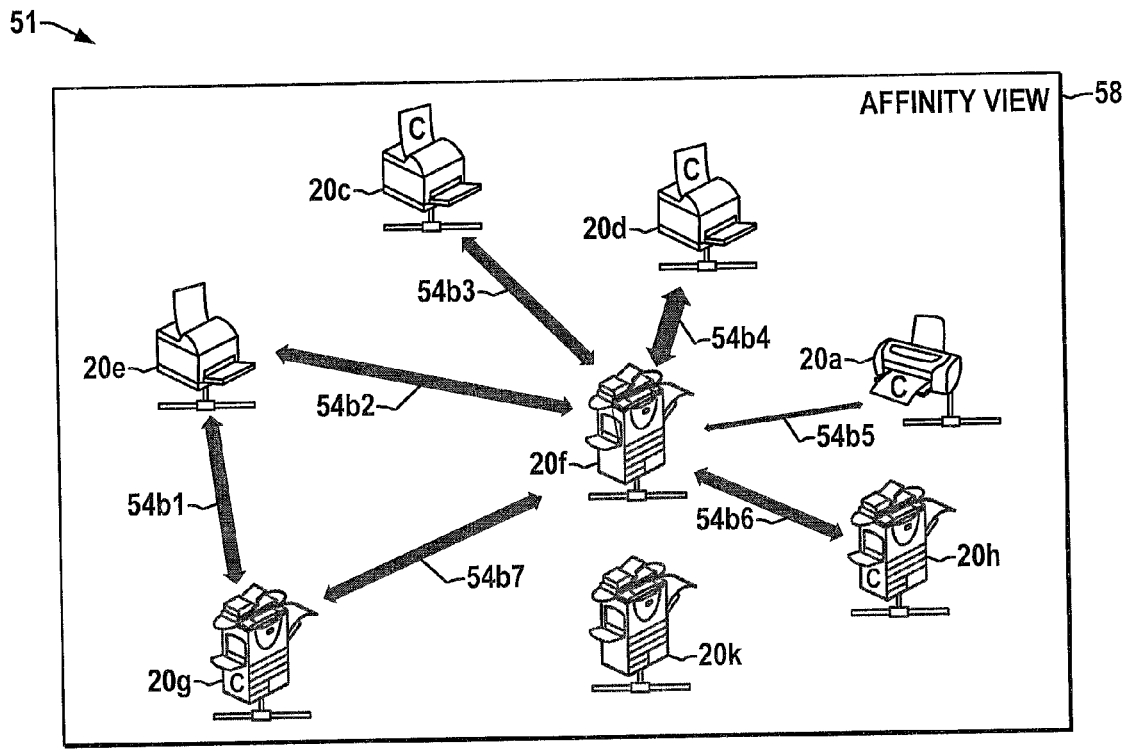
FIG. 3 is a schematic diagram illustrating an exemplary affinity view user interface rendering in the device manager of FIGS. 1 and 2 showing affinity relationships between various printer devices based on job tracking data in the network.

FIG. 3 depicts an exemplary affinity view 58 which may be rendered or otherwise presented to an operator via the user interface 51 associated with the server 50 in the system 2. In the simplified depiction of FIG. 3, only a few exemplary printer devices 20 are shown so as not to obscure the various aspects of the present disclosure and it will be appreciated that affinity views 58 of large networked systems 2 may include graphical indicia or icons representing any number of networked printers 20 and the affinities therebetween. In the example of FIG. 3, affinities between printers 20 are represented as bidirectional arrows 54b, wherein the thickness of the arrow 54b indicates the value of the printer-to-printer affinity with thicker arrows 54b indicating stronger affinities and vice versa. In this embodiment, moreover, the affinity view 58 may automatically group icons of strongly affine printers 20 together with devices 20 having weak affinities spaced from the strongly affine groups or clusters, in order to allow an operator to easily see the affinity relationships of the various printer devices 20 in a given system 2 or a portion thereof. Alternatively or in combination, the affinity view 58 may allow an operator to drag the printer device icons 20 as desired to more easily ascertain affinities of a given printer 20 or printer group.

The affinity relationships shown in FIG. 3 represent a static situation at one particular point in time, whereas FIGS. 4-6 below illustrate the dynamic affinity changes over time as users modify their behavior in response to an unreported printer failure. In the static situation of FIG. 3, several of the printer devices 20a, 20c, 20d, 20e, 20f, 20g, 20h, and 2k are shown from the system 2 of FIGS. 1 and 2, wherein certain devices 20 and users 30 are omitted from the depiction of FIG. 3 for clarity. In certain embodiments, moreover, the affinity view 58 may provide indicia of reported service or maintenance status or requirements of the indicated printer devices 20, thereby facilitating the identification by an operator of which printers 20 require servicing and/or maintenance, and also may provide an indication of a printer 20 for which a potential failure has been identified according to the herein described aspects of the present disclosure. In one possible implementation of the affinity view 58 in the user interface 51, an operator can roll a mouse or other pointing device (not shown) over a given printer icon 20 and be provided with text, audible information, or other indication of the status of the device 20, such as text indicating "out-of-paper", "off-line", "potential printer failure", etc. In another possible embodiment, the affinity view 58 may provide different colors to the printer device icons in order to indicate status information. In this example, an icon may be colored red for devices 20 in need of service, with other colors being used to indicate printer devices 20 in need of maintenance or those having no known maintenance or servicing requirements, and different colors may be used to indicate printers 20 identified as having potential failures as per the present disclosure.

As shown in the case of FIG. 3, a strong affinity 54b1 exists between printers 20e and 20g, thereby indicating that users of printer 20e are very likely to also utilize printer 20g and vice versa. Somewhat weaker affinities exist in this example between printers 20e and 20f (affinity 54b2), printers 20c and 20f (affinity 54b3), printers 20g and 20f (affinity 54b7), and between printers 20f and 20h (affinity 54b6). In addition, a strong affinity 54b4 exists between printers 20d and 20f, while a fairly weak affinity 54b5 is shown in the affinity view 58 between printers 20a and 20f. Moreover, printer 20k has little or no affinity to any other illustrated printers 20.

Figure 4:
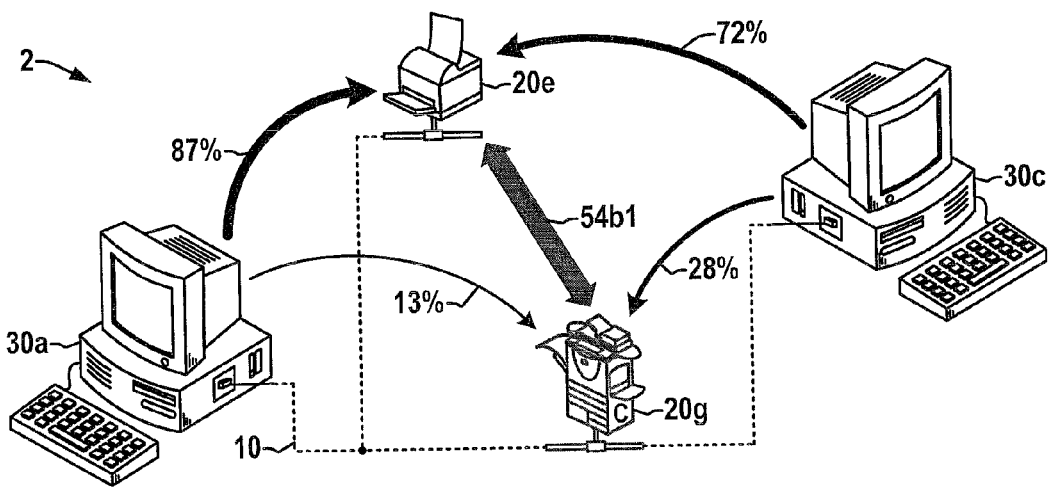
FIGS. 4-6 are schematic diagrams illustrating an exemplary pair of printers and two user computers in the system of FIGS. 1 and 2 showing reducing affinity of one of the printers in favor of the other printer indicating a potential fault in the first printer device.
Figure 5:
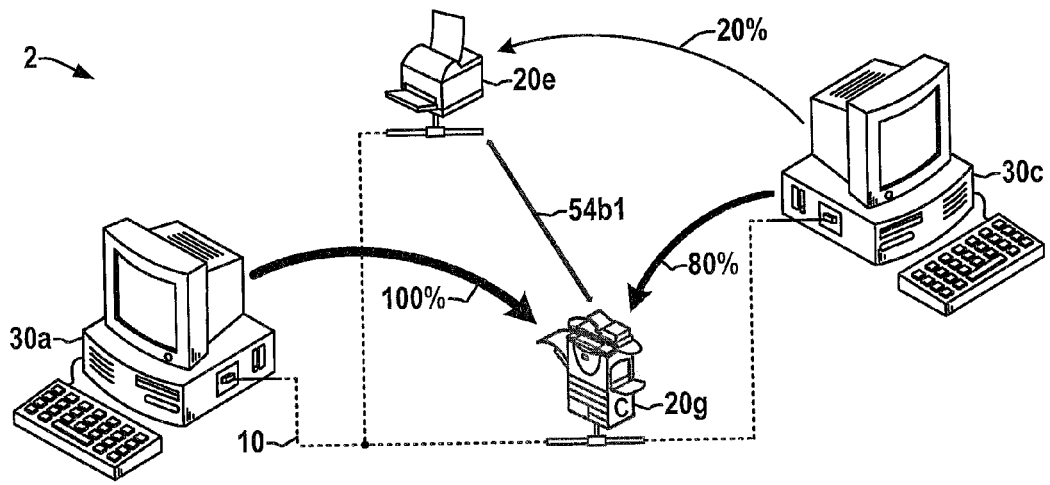
Figure 6:
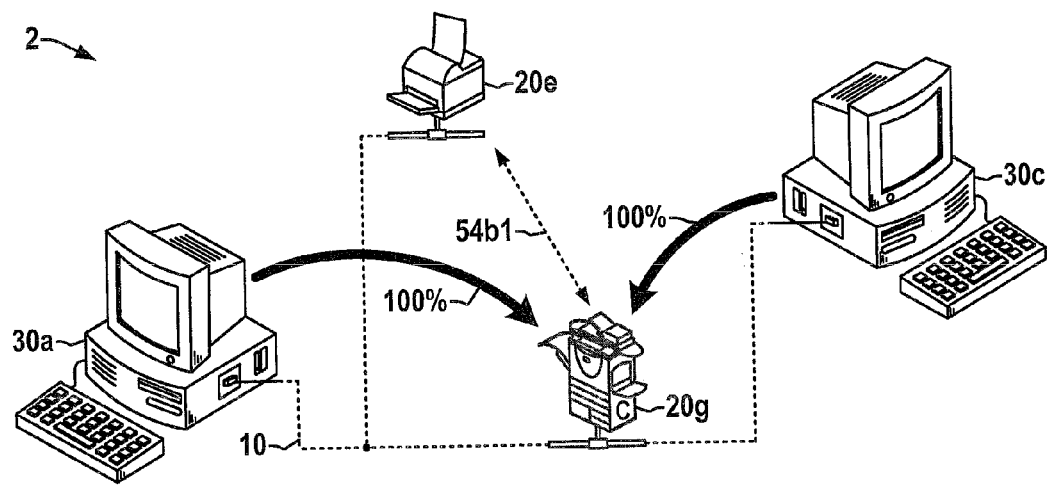

Referring now to FIGS. 4-6, certain aspects of the present disclosure are illustrated in the context of an exemplary affinity situation involving the printer devices 20e and 20g, as well as user computer devices 30a and 30c in the system 2. The situation begins in FIG. 4 at which time a relatively strong affinity 54b1 exists between the printers 20e and 20g. The affinity 54b1 is determined in this situation based on common usage of both printers 20e and 20g by user devices 30a and 30c. Initially, the user of device 30a sends approximately 87% of his or her print jobs to printer 20e and sends the remaining 13% to printer 20g, as measured over a given time period (e.g., minutes, hours, days, weeks, etc.) based on the job tracking data 53. At the time depicted in FIG. 4, moreover, 72% of the print jobs submitted from the user device 30c are sent to printer 20e with the remaining 28% going to printer 20g. Thus, at the time shown in FIG. 4, there is a relatively strong affinity value 54b1 associated with the printers 20e and 20g due to the usage patterns of the users 30a and 30c.

The present disclosure contemplates that changes in the affinity values 54b over time may be indicative of changed user behavior with respect to printers 20 selected for submitted print jobs, and may thus be correlated to suspected or potential printer device failures in a networked system 2. In this respect, the changes in the job submission by one or more users 30 can be detected from the job tracking data 53 generally, and specifically from the affinity data 54a derived therefrom, and such changes may be due, at least one part, to a user knowing or suspecting degraded printer performance, breakdown, configuration problem, etc., and choosing to instead print to a different printer 20. By assessing changes in the job tracking data 53 and/or the affinity data 54a, such conditions can be identified as potential printer failures to facilitate timely performance of remedial steps without relying on a user reporting a printer problem or the printer 20 itself diagnosing a problem. In this manner, therefore, potential printer problems are identified at least partially according to the job tracking data 53 independent of whether or not a report has been generated by a user and/or by a printer 20 itself relating to the identified printer problem. Furthermore, the present disclosure facilitates detection of printer faults that may not be identifiable by on-board printer diagnostics, and thus enhances the ability to identify and service printer problems in the system 2 in a timely fashion. In this regard, the potential printer failure identification can be termed soft failure detection, as no operator or user action is required, and since the identified faults may be unrelated to actual printer malfunction, but instead may relate to configuration settings or other issues that can be remedied without actual printer machine repair.

The identified or detected printer failures, moreover, may be any type or form of failure, problem, fault, or other adverse condition associated with a networked printer 20 including without limitation configuration changes or settings that are not preferred by one or more users 30 or are somehow incompatible or less than optimal for servicing jobs from a given user machine 30, or are causing print or usability problems, print quality deterioration which may be caused by a non-reported failure of a component or by a component nearing end of life or by other cause, color problems that are related to a specific color being missing or to a color that is either related to trapping or separation issues, issues relating to duplex registration and/or trapping, material and supply replenishment needs, actual printer device malfunctions or loss of power or off-line conditions requiring printer resetting operations, etc. By the automatic detection of suspected soft printer failures through analysis of the affinities between print devices 20 over time, changes in the affinities can be used to deduce problems that may be unreported by the print device, but which affect the behavior of the users 30 previously tending to use a given printer device 20.

In the situation of FIGS. 4-6, the users 30a and 30c that send print jobs to printer 20e also send jobs to printer 20g, and if both printers were operating correctly, it can be inferred from the affinity 54b1 that both printers 20e and 20g are likely to have similar functions and abilities, and that the users 30a and 30c can probably fulfill their print job needs at either printer 20e or 20g, but prefer to print to the printer 20e, at least for jobs that printer 20e can accommodate. For instance, it may be that the users 30a and 30c are closer to printer 20e than to printer 20g. Printer 20g may also be a higher cost asset than printer 20e, or printer 20g may be shared by many more users 30 than printer 20e, and/or there may be any number of other reasons for the users 30a and 30c preferring printer 20e over printer 20g up to the time period represented by FIG. 4.

As shown in FIG. 5, some time later, the affinity 54b1 between printer 20e and printer 20g changes (is reduced), with the job tracking data 53 now indicating that user 30a has substantially stopped using printer 20e and is now sending substantially all (100%) print jobs instead to printer 20g, while user 30c has also reduced it's dependence on printer 20e in favor of printer 20g. Turning also to FIG. 6, at a time subsequent to that shown in FIG. 5, the user 30a continues to avoid printer 20e, as does user 30c, by which the affinity value 54b1 is essentially reduced to zero in this simplified example. While the change in printing habits of user 20a may be due to any number of factors, the fault detection component 56 identifies possible printer problems with the newly less favored printer 20e, for example, if the change in the affinity value 54b1 exceeds a predefined threshold. In another embodiment, the mere fact that the changed affinity value 54b1 indicates that the preferences of user 30a have changed away from printer 20e, regardless of which other printer 20 has received the print jobs in lieu of printer 20e. In another implementation, the identification of potential printer failure in printer 20e can be made solely on the fact that affinity data 54a indicates that the user 30a has substantially stopped printing to printer 20e in favor of another printer (printer 20g in this example). Thus, at the point in time illustrated in FIG. 5 or FIG. 6, the soft failure detection component 56 (FIG. 2) identifies a potential printer problem associated with printer 20e, based on the job tracking data 53 and/or according to the affinity data 54a obtained from the job tracking data 53.

It is also noted in this example, that the change in the usage pattern of user 30c by itself could also trigger an identification of a potential printer failure for printer 20e. As shown in FIG. 5, the user 30c is still submitting a portion (e.g. 20%) of its print jobs to the printer 20e, but is now sending the majority (80%) to the printer 20g, indicating a significant usage pattern shift from the situation of FIG. 4 away from printer 20e and toward printer 20g. Thus, the exemplary soft failure detection component 56 would identify a potential printer failure in printer 20e based on this preference change by the user 30c away from the printer device 20e.

Figure 7:
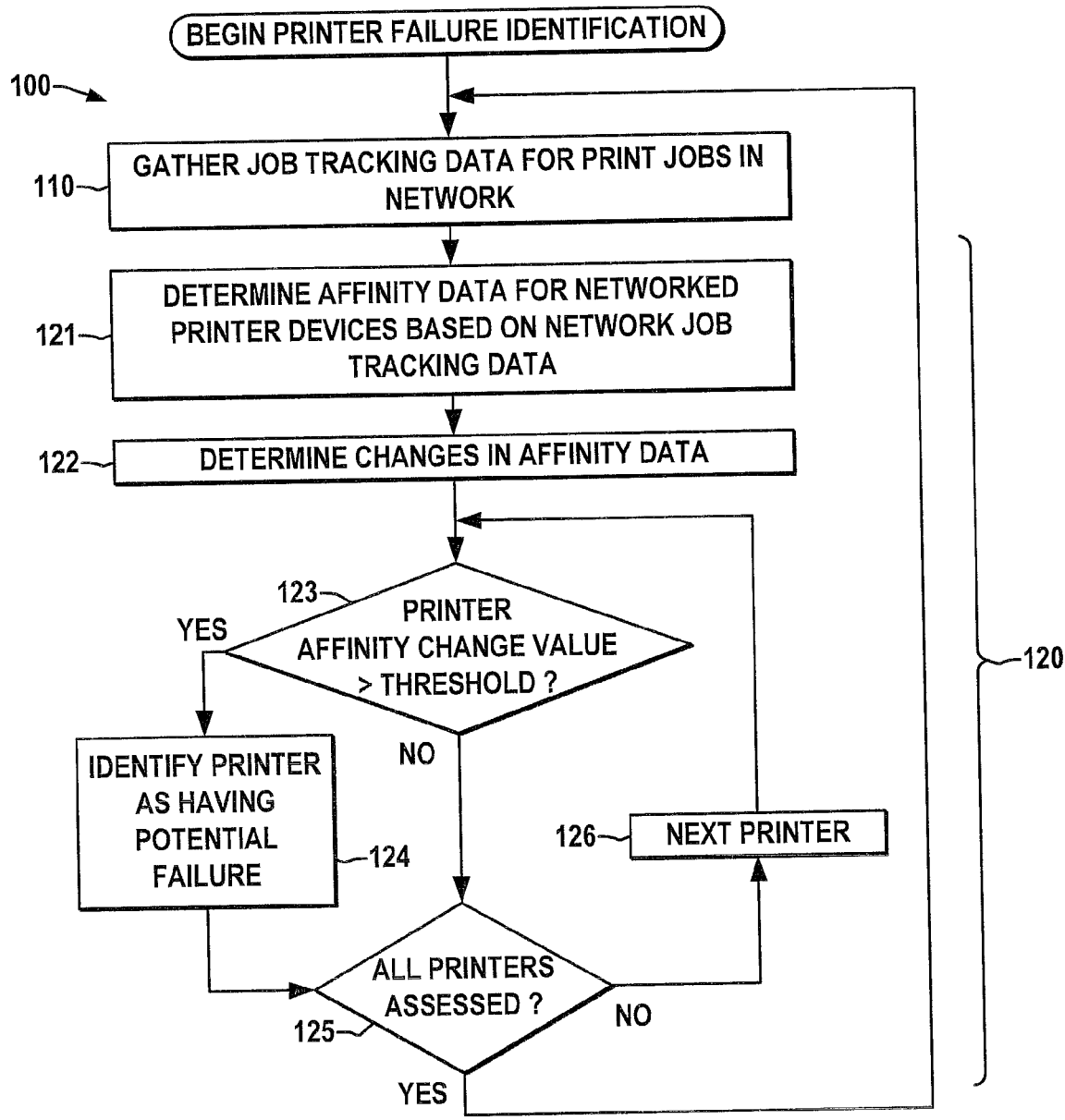
FIG. 7 is a flow diagram illustrating an exemplary method for identifying or detecting potential printer device failures or usage pattern changes in a networked printer environment according to the present disclosure.

Referring also to FIG. 7, a flow diagram is provided illustrating an exemplary method 100 for detecting a change in a patter of printer usage and for identifying potential printer device failures in a networked printer environment in accordance with the present disclosure, which can be implemented in any suitable system or device, such as in the exemplary printer device manager component 52 in the embodiments of FIGS. 1-6 above. Although the method 100 is illustrated and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated method 100 and other methods of the disclosure may be implemented in hardware, software, or combinations thereof, whether in a single device management component or system or in distributed form in two or more components or systems, and may be employed in association with any form of printing devices including without limitation desktop printers, network printers, copiers, scanners, facsimile machines, multi-function printer/copier/facsimile devices, high-speed printing/publishing systems and digital printing presses, etc., wherein the disclosure is not limited to the specific devices, systems, applications, and implementations illustrated and described herein.

The method 100 begins at 110 with the gathering of job tracking data 53 for print jobs in the network 2, such as by the device manager application 52 or the affinity component 54 thereof in the server 50, with the device manager 52 providing the tracking data 53 to the affinity component 54 in the example of FIGS. 1-6 above. At 120 in FIG. 7, potential printer failures are identified and changes in printer device usage patterns are detected based at least in part on the job tracking data 53, and the process at 110 and 120 is repeated in continuous fashion in this implementation. The tracking data 53 may be updated at 110 at any regular or other interval, and the determination of usage pattern changes and potential printer faults may be performed at 120 using job tracking and/or affinity data over any suitable time window length.

In one embodiment, the usage changes and potential printer failures are identified at 120 according to affinity data 54a derived from the job tracking data 53, wherein affinity data 54a is determined for the networked printer devices 20 at 121 in the example of FIG. 7 based on the tracking data 53. As described above, any suitable computational techniques or algorithms can be employed in deriving the affinity data 54a from the job tracking data 53 in accordance with the present disclosure to provide data 54a that is indicative of the common usage relationships of groups of printers 20. Changes in the affinity data 54a are determined at 122, such as by any suitable mathematical techniques for identifying changing values in the affinity data 54a from which user printing usage pattern changes can be detected. In one example, the determinations at 122 provide a change value for each affinity value, and the changes related to a given printer device 20 are then compared with a threshold at 123. If the change exceeds the threshold (YES at 123), the associated printer 20 is identified at 124 as having a potential failure and a determination is made at 125 as to whether all printers 20 have been thus assessed. If not (NO at 125), the process 100 continues to the next printer 20 at 126 and the affinity change associated therewith is compared with the threshold at 123. If the assessed printer affinity value change does not exceed the threshold (NO at 123), the process proceeds to determine at 125 whether all the printers 20 have been assessed as described above. Once all the printer affinity changes have been assessed at 123-125 (YES at 125), the process returns to 110 where the job tracking data gathering continues and the affinity data 54a is again determined at 121.

It is noted in the example of FIG. 7 that different thresholds can be used for different printers at 123 and that the affinity data 54a can be computed based on job tracking data 53 obtained over a given time window length, wherein such a time window length may be adjustable, and wherein different window lengths may be used in computing affinity data 54a for different printers 20 or sets thereof, with all such variant implementations being contemplated as falling within the scope of the present disclosure.

In another possible embodiment, the affinity change values are scrutinized at 123 to ascertain whether they indicate a change in user preference away from the printer device 20 being assessed, and if so, the process 100 proceeds to identify a potential printer failure at 124 as described above. In this case, the shift away from a given printer 20 may trigger an identification of potential printer fault 57 regardless of the magnitude of the affinity value change. In other possible embodiments, a determination is made at 123 as to whether the affinity data change indicates that at least one user 30 has substantially stopped printing to the assessed printer device 20 in favor of another printer 20 (e.g., such as the example in FIGS. 4 and 5 above in which the user 30a essentially stops all or most use of printer 20e in favor of using the other printer 20g). Possible implementations can trigger the identification of a potential printer device failure based on one, some, or all of these types of assessments at 123, or on other assessments that indicate the possibility of a user behavior change that could be attributable to a printer anomaly.

In addition to identifying potential printer failures, these principles may be applied in detecting a change in pattern of use of networked printers 20 generally, wherein such detected usage change information may be employed for any useful purpose in networked system management beyond merely identifying printer problems. In one possible implementation, the present disclosure contemplates methods for usage pattern changes that include gathering job tracking data 53 for print jobs in a network (e.g., as shown at 110 in FIG. 7), determining affinity data 54a indicating associations between printer devices 20 and user devices 30 based on the job tracking data 53 (e.g., at 121 in FIG. 7), and determining changes in the affinity data 54a (e.g., at 122). The technique also includes detecting a change in the pattern of use of a given printer device 20 based on a change in the affinity data 54a associated with that printer 20. The detected usage change may be employed in certain examples for identifying potential printer failures 57, such as described above. In one embodiment, the detected usage change is used in this regard by identifying a potential failure in a given printer device 20 if the detected change in the pattern of use of the printer 20 exceeds a threshold value, such as described above at 123 in FIG. 7. In another embodiment, the method includes identifying a printer 20 as having a potential failure if the detected change in the pattern of use indicates a change in user preference away from the printer 20. Still other embodiments include identifying a potential printer failure if the detected change in the pattern of use of the printer 20 indicates that one or more users have substantially stopped printing to the printer 20 in favor of another printer device 20.

The above described examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A method for identifying potential printer failures in a networked printing system, the method comprising:
gathering job tracking data for print jobs in a network; and
identifying potential printer failures based at least partially on the job tracking data, comprising:
determining affinity data based on the job tracking data, the affinity data comprising a plurality of affinity values associated with each of a plurality of printer devices in the networked printing system, each affinity value corresponding to a single given user device and a single given printer device and representing a proportion of print jobs submitted by a user of the given user device for which the given printer device was selected;
determining changes in the affinity values; and
identifying potential printer failures based at least partially on the changes in the affinity values.

2. The method of claim 1, wherein identifying potential printer failures comprises identifying a potential failure in a first printer device if a change in at least one affinity value corresponding to the first printer device exceeds a threshold value.

3. The method of claim 1, wherein identifying potential printer failures comprises identifying a first printer device as having a potential failure if a change in at least one affinity value corresponding to the first printer device indicates a change in user preference away from the first printer device.

4. The method of claim 1, wherein identifying potential printer failures comprises identifying a first printer device as having a potential failure if a change in at least one affinity value corresponding to the first printer device indicates that at least one user has substantially stopped printing to the first printer device in favor of another printer.

5. The method of claim 1, wherein the job tracking data includes an identity of a submitting user device, a time and date of job submission, and a target printer device to which a job was initially submitted.

6. The method of claim 5, wherein the job tracking data includes an identity of a secondary or alternate printer device to which the job was redirected.

7. A method of detecting a change in pattern of use of networked printers, comprising:
gathering job tracking data for print jobs in a network;
determining affinity data based on the job tracking data, the affinity data comprising a plurality of affinity values associated with each of a plurality of printer devices in the networked printing system, each affinity value corresponding to a single given user device and a single given printer device and representing a proportion of print jobs submitted by a user of the given user device for which the given printer device was selected;
determining changes in the affinity values; and
detecting a change in pattern of use of a first printer device based on a change in the affinity values associated with the first printer device.

8. The method of claim 7, further comprising identifying a potential failure in the first printer device if a change in at least one affinity value corresponding to the first printer device exceeds a threshold value.

9. The method of claim 7, further comprising identifying a first printer device as having a potential failure if a change in at least one affinity value corresponding to the first printer device indicates a change in user preference away from the first printer device.

10. The method of claim 7, further comprising identifying a first printer device as having a potential failure if a change in at least one affinity value corresponding to the first printer device indicates that at least one user has substantially stopped printing to the first printer device in favor of another printer device.

11. The method of claim 7, wherein the job tracking data includes an identity of a submitting user device, a time and date of job submission, and a target printer device to which a job was initially submitted.

12. The method of claim 11, wherein the job tracking data includes an identity of a secondary or alternate printer device to which the job was redirected.

13. A system for identifying potential printer failures in a networked printing system, comprising:
a server with a processor, the server being coupled to a network and including:
an affinity component operative to gather job tracking data for print jobs in the network, and to determine affinity data based on the job tracking data, the affinity data comprising a plurality of affinity values associated with each of a plurality of printer devices in the networked printing system, each affinity value corresponding to a single given user device and a single given printer device and representing a proportion of print jobs submitted by a user of the given user device for which the given printer device was selected; and
a failure detection component operative to determine changes in the affinity values, and to identify potential printer failures based at least partially on the changes in the affinity values.

14. The system of claim 13, wherein the failure detection component identifies a first printer device as having a potential failure if a change in at least one affinity value corresponding to the first printer device indicates a change in user preference away from the first printer device.

15. The system of claim 14, wherein the affinity component and the failure detection component are implemented using at least one software program running on a network server.

16. The system of claim 13, wherein the failure detection component identifies a potential failure in a first printer device if a change in at least one affinity value corresponding to the first printer device exceeds a threshold value.

17. The system of claim 13, wherein the affinity component and the failure detection component are implemented using at least one software program running on a network server.

18. The system of claim 13, wherein the failure detection component identifies a first printer device as having a potential failure if the job tracking data indicates a change in user preference away from the first printer device.

19. The system of claim 13, wherein the failure detection component identifies a first printer device as having a potential failure if the job tracking data indicates that at least one user has substantially stopped printing to the first printer device in favor of another printer device.

20. The system of claim 13, wherein the job tracking data includes an identity of a submitting user device, a time and date of job submission, and a target printer device to which a job was initially submitted.

21. The system of claim 20, wherein the job tracking data includes an identity of a secondary or alternate printer device to which the job was redirected.

\* \* \* \* \*